US010281676B2

(12) United States Patent
Lin et al.

(10) Patent No.: US 10,281,676 B2

(45) Date of Patent: May 7, 2019

(54) PLASTIC BARREL, LENS MODULE AND ELECTRONIC DEVICE

(71) Applicant: LARGAN PRECISION CO., LTD., Taichung (TW)

(72) Inventors: Cheng-Feng Lin, Taichung (TW); Wei-Hung Weng, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 70 days.

(21) Appl. No.: 14/970,696

(22) Filed: Dec. 16, 2015

(65) Prior Publication Data

US 2017/0131513 A1 May 11, 2017

(30) Foreign Application Priority Data

Nov. 9, 2015 (TW) ............................ 104217937 U

(51) Int. Cl.

*G02B 7/02* (2006.01)
*G02B 13/00* (2006.01)

(52) U.S. Cl.

CPC ............ *G02B 7/021* (2013.01); *G02B 7/022* (2013.01); *G02B 13/001* (2013.01)

(58) Field of Classification Search

CPC .......... G02B 7/04; G02B 7/026; G02B 7/021; G02B 7/023; G02B 7/022

USPC ........................................................ 359/829

See application file for complete search history.

(56) References Cited

U.S. PATENT DOCUMENTS 7,626,773 B2 12/2009 Noda et al.
7,787,184 B2 * 8/2010 Yoshikawa ............ G02B 1/118 359/577
8,529,075 B2 * 9/2013 Yamada ................. G02B 1/118 359/614
9,069,119 B2 * 6/2015 Takase ................... G02B 7/021
9,329,355 B2 * 5/2016 Lyu ........................ G02B 7/021
2002/0126398 A1 * 9/2002 Moriya .................. G02B 7/026 359/819

(Continued)

FOREIGN PATENT DOCUMENTS

TW M481412 U 7/2014

*Primary Examiner* — Joseph P Martinez

*Assistant Examiner* — Vipin Patel

(74) *Attorney, Agent, or Firm* — McClure, Qualey & Rodack, LLP

(57) ABSTRACT

A plastic barrel includes an object-end portion, an image-end portion, an inner tube portion and a plurality of protrusions. The object-end portion includes an outer object-end surface, an object-end hole and an inner annular object-end surface. One side of the inner annular object-end surface is connected to the outer object-end surface and surrounds the object-end hole. The image-end portion includes an outer image-end surface, an image-end opening and an inner annular image-end surface. The inner annular image-end surface is connected to the outer image-end surface and surrounds the image-end opening. The inner tube portion connects the object-end portion and the image-end portion and includes a plurality of inclined surfaces. The protrusions are disposed at least on one of the inner annular object-end surface, the inner annular image-end surface and the inclined surfaces, wherein the protrusions are regularly arranged around the central axis of the plastic barrel.

14 Claims, 18 Drawing Sheets

100
112
110
115
111
114
150
120
140
115

(56) References Cited

U.S. PATENT DOCUMENTS

| | | | | |
|---|---|---|---|---|
| 2006/0158748 | A1* | 7/2006 | Hirata | G02B 7/021 359/811 |
| 2009/0244735 | A1* | 10/2009 | Sasaki | G02B 7/021 359/830 |
| 2012/0008219 | A1* | 1/2012 | Huang | G02B 7/022 359/819 |
| 2014/0133040 | A1* | 5/2014 | Tsai | G02B 7/02 359/819 |
| 2015/0253569 | A1 | 9/2015 | Lin | |

* cited by examiner 400
420
422
425
436
421
414
410
436
440

540
536
w
536
520
500
521

PLASTIC BARREL, LENS MODULE AND ELECTRONIC DEVICE

RELATED APPLICATIONS

This application claims priority to Taiwan Application Serial Number 104217937, filed Nov. 9, 2015, which is herein incorporated by reference.

BACKGROUND

Technical Field

The present disclosure relates to a plastic barrel and a lens module. More particularly, the present disclosure relates to a plastic barrel and a lens module which are applicable to portable electronic devices.

Description of Related Art

Due to the popularity of personal electronic products and mobile communication products having camera functionalities, such as smart phones and tablet personal computers, the demand for compact imaging apparatuses has been increasing, and the requirements for high resolution and image quality of present compact imaging apparatuses increase significantly.

A plastic barrel is generally used to carry a lens module and provide an optical space between any two lens elements thereof. A surface property of the plastic barrel relates to an effect of suppressing the non-imaging light. Accordingly, an image quality of the lens module is influenced by the surface property of the plastic barrel.

A conventional plastic barrel is typically formed by an injection molding method and has a smooth and bright surface, which is featured with high reflectivity. As a result, the non-imaging light reflected from the aforementioned surface of the conventional plastic barrel cannot be effectively attenuated.

Another conventional plastic barrel is provided for suppressing the non-imaging light. The conventional plastic barrel is atomized with a surface treatment, so that a reflectivity thereof is reduced. However, the effect of suppressing the non-imaging light is still limited. Therefore, the conventional plastic barrel cannot satisfy the requirements of high-end optical systems with camera functionalities.

Given the above, how to improve the surface property of the plastic barrel for enhancing the image quality of compact lens modules has become one of the important subjects.

SUMMARY

According to one aspect of the present disclosure, a plastic barrel includes an object-end portion, an image-end portion, an inner tube portion and a plurality of protrusions. The object-end portion includes an outer object-end surface, an object-end hole and an inner annular object-end surface. One side of the inner annular object-end surface is connected to the outer object-end surface and surrounds the object-end hole. The image-end portion includes an outer image-end surface, an image-end opening and an inner annular image-end surface. The inner annular image-end surface is connected to the outer image-end surface and surrounds the image-end opening. The inner tube portion connects the object-end portion and the image-end portion and includes a plurality of inclined surfaces. Each of the inclined surfaces has an angle with a central axis of the plastic barrel. The protrusions are disposed at least on one of the inner annular object-end surface, the inner annular image-end surface and the inclined surfaces, wherein the protrusions are regularly arranged around the central axis of the plastic barrel.

According to another aspect of the present disclosure, a lens module includes the plastic barrel according to the foregoing aspect and an optical lens assembly, which is disposed in the plastic barrel and includes a plurality of lens elements.

According to another aspect of the present disclosure, an electronic device includes the lens module according to the foregoing aspect.

BRIEF DESCRIPTION OF THE DRAWINGS

FIG. 10 shows a schematic view of the parameters w and h of the plastic barrel according to the 1st embodiment;

DETAILED DESCRIPTION

1st Embodiment

Figure 1A:
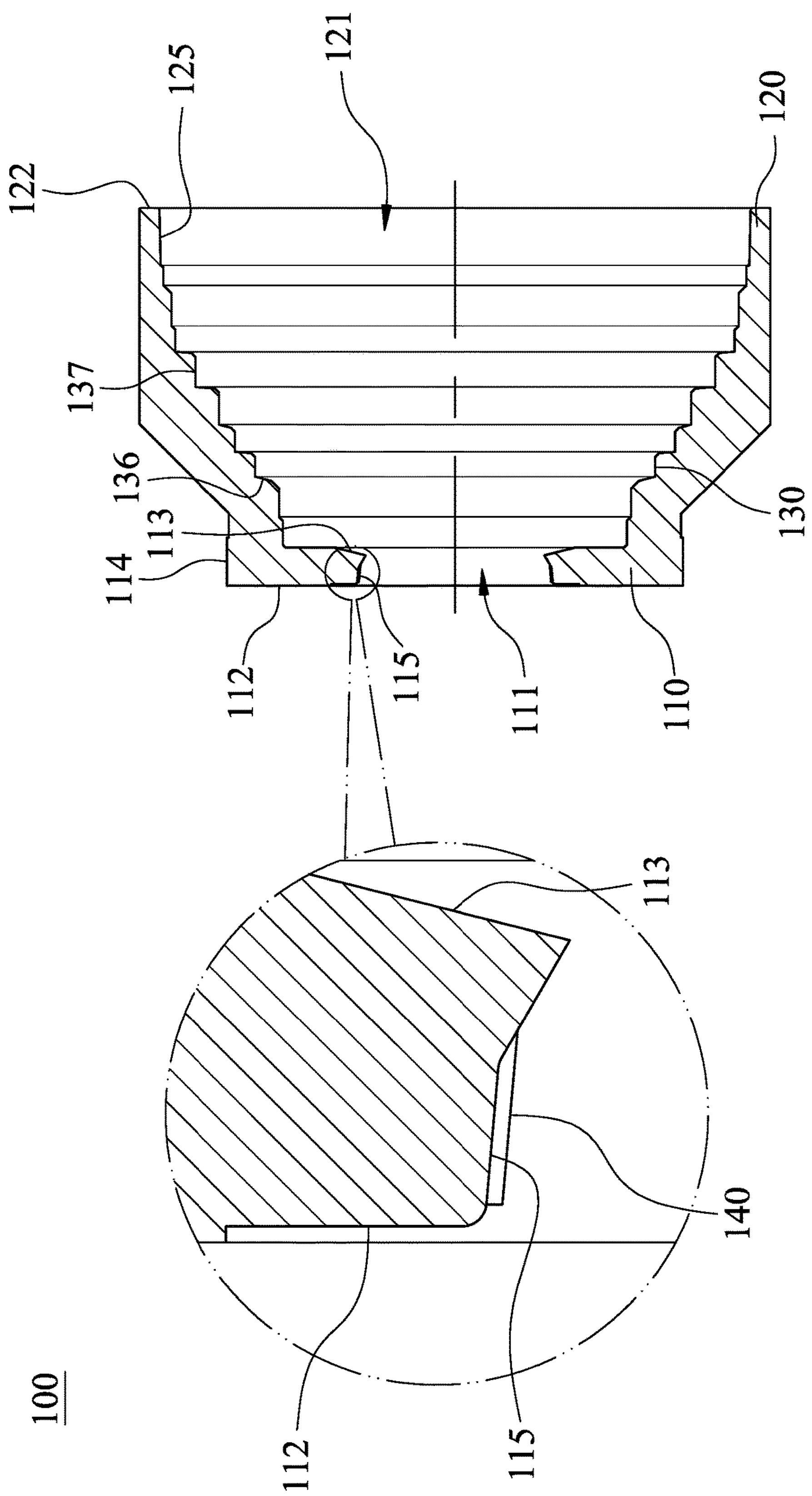
FIG. 1A is a schematic view of a plastic barrel according to the 1st embodiment of the present disclosure.
Figure 1B:
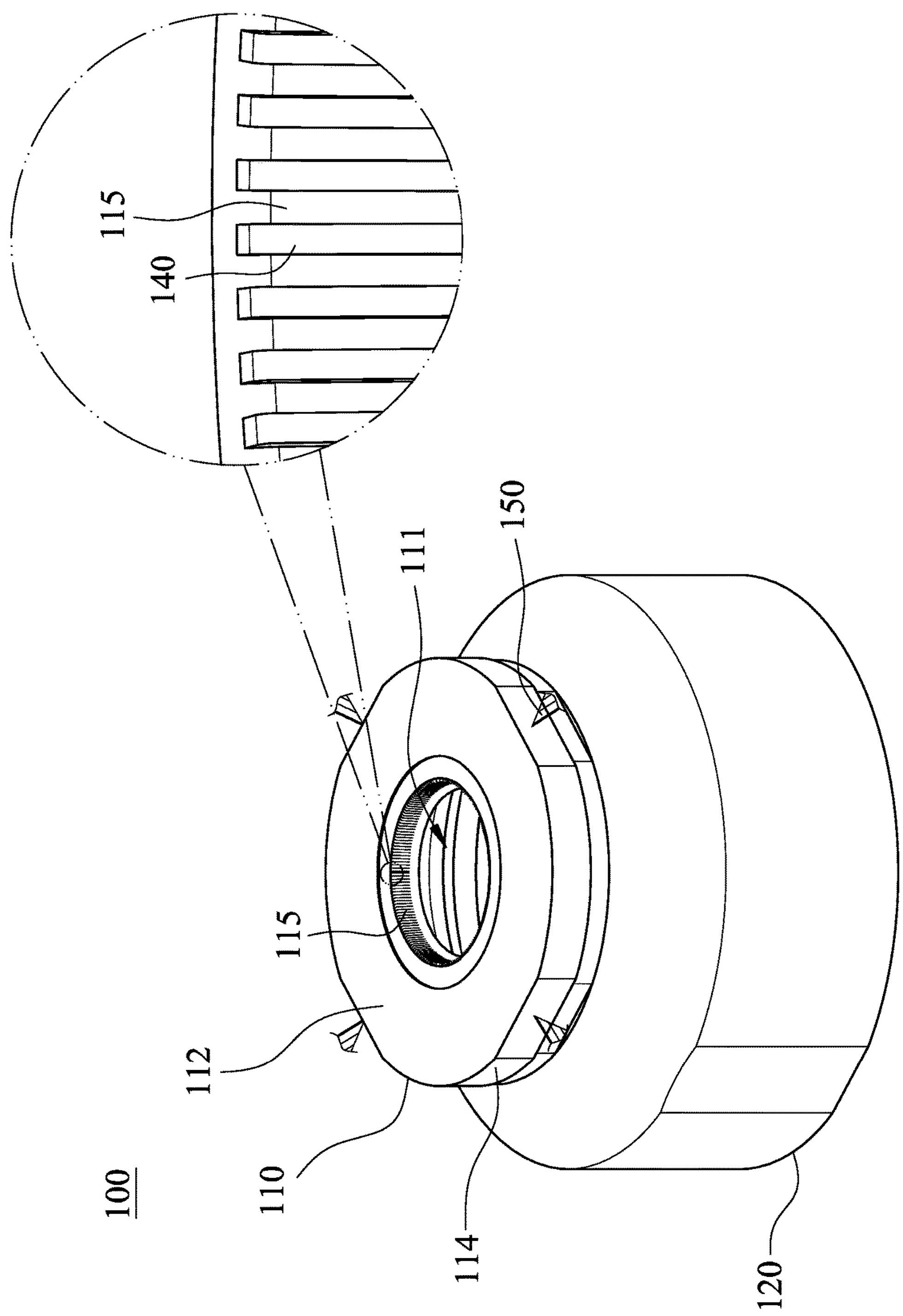
FIG. 1B shows a schematic view of the protrusions of the plastic barrel according to the 1st embodiment.

FIG. 1A is a schematic view of a plastic barrel 100 according to the 1st embodiment of the present disclosure, and FIG. 1B shows a schematic view of a plurality of protrusions 140 of the plastic barrel 100 according to the 1st embodiment. In FIG. 1A and FIG. 1B, the plastic barrel 100 includes an object-end portion 110, an image-end portion 120, an inner tube portion 130 and the protrusions 140.

The object-end portion 110 includes an outer object-end surface 112, an object-end hole 111 and an inner annular object-end surface 115. The outer object-end surface 112 is the surface of the plastic barrel 100 facing an object (not shown). One side of the inner annular object-end surface 115 is connected to the outer object-end surface 112 and surrounds the object-end hole 111.

The image-end portion 120 includes an outer image-end surface 122, an image-end opening 121 and an inner annular image-end surface 125. The outer image-end surface 122 is the surface of the plastic barrel 100 facing an image surface (not shown). The inner annular image-end surface 125 is connected to the outer image-end surface 122 and surrounds the image-end opening 121.

The inner tube portion 130 connects the object-end portion 110 and the image-end portion 120, wherein the inner tube portion 130 surrounds a central axis of the plastic barrel 100 and faces the central axis. The inner tube portion 130 includes a plurality of inclined surfaces 136, wherein each of the inclined surfaces 136 has an angle with the central axis, which is greater than 0 degrees and less than 90 degrees. In other words, each of the inclined surfaces 136 is neither parallel nor orthogonal to the central axis of the plastic barrel 100.

The protrusions 140 are disposed at least on one of the inner annular object-end surface 115, the inner annular image-end surface 125 and the inclined surfaces 136, wherein the protrusions 140 are regularly arranged around the central axis of the plastic barrel 100. Therefore, it is favorable for effectively attenuating the non-imaging light reflected from the aforementioned surface so as to improve the image quality of the lens module. In the 1st embodiment, the inner annular object-end surface 115 has a circumferential direction around the central axis of the plastic barrel 100, wherein the protrusions 140 with the same geometric structures are disposed on the inner annular object-end surface 115, and regularly arranged with the same spaces in the circumferential direction around the central axis of the plastic barrel 100. Furthermore, in other embodiments (not shown), the protrusions can be disposed on the inner annular object-end surface, the inner annular image-end surface, the inclined surfaces or a combination of the foregoing, wherein the protrusions are regularly arranged around the central axis of the plastic barrel.

In details, the protrusions 140 and the plastic barrel 100 can be formed integrally. Therefore, it is favorable for maintaining the manufacturing conveniences of the plastic barrel 100.

The object-end portion 110 can further include an inner object-end surface 113 connected to the other side of the inner annular object-end surface 115, wherein the inner object-end surface 113 is disposed correspondingly to the outer object-end surface 112. Furthermore, the protrusions 140 can be disposed on the inner annular object-end surface 115 and near the outer object-end surface 112. Therefore, it is favorable for effectively attenuating the non-imaging light reflected from the inner annular object-end surface 115 so as to improve the image quality of the lens module. In the 1st embodiment, the protrusions 140 are disposed on the inner annular object-end surface 115 and near the outer object-end surface 112.

A number of the protrusions 140 can be greater than or equal to 80, and smaller than or equal to 800. Therefore, it is favorable for maintaining the denseness of the protrusions 140 so as to enhance the attenuation amplitude of the non-imaging light.

FIG. 10 shows a schematic view of the parameters w and h of the plastic barrel 100 according to the 1st embodiment. In FIG. 10, when a width of each of the protrusions 140 in the circumferential direction of the plastic barrel 100 is w, the following condition can be satisfied: $0.01\ mm<w<0.05\ mm$. Therefore, it is favorable for increasing the roughness of the inner annular object-end surface 115 so as to diverge the non-imaging light.

Figure 1C:
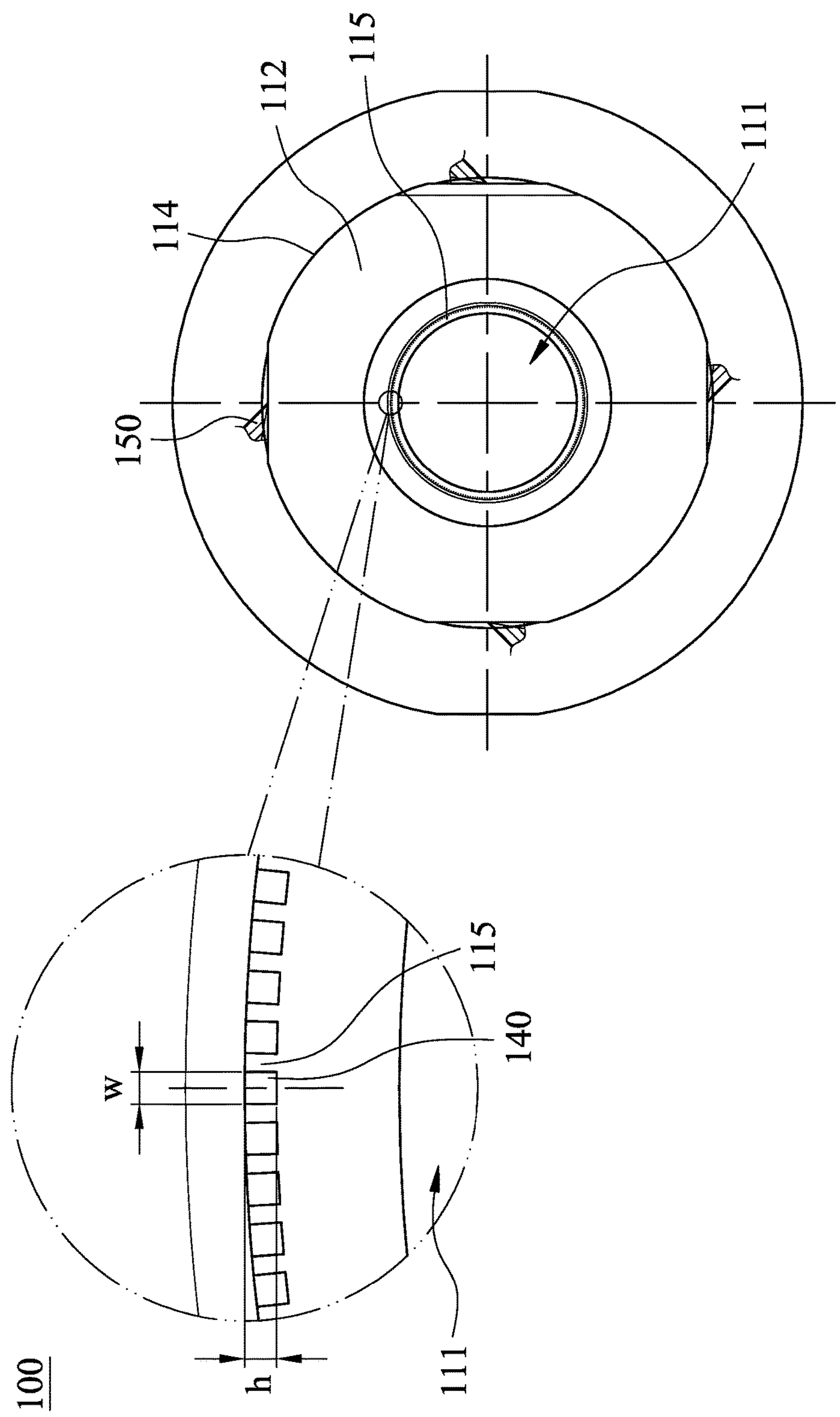

In FIG. 1C, when a height of each of the protrusions 140 is h, the following condition can be satisfied: $0.01\ mm<h<0.06\ mm$. Therefore, it is favorable for increasing the unevenness of the inner annular object-end surface 115 so as to attenuate the non-imaging light.

In FIG. 1A, an outer diameter of the object-end portion 110 can be smaller than an outer diameter of the image-end portion 120. Therefore, it is favorable for maintaining the uniformity of thickness of the plastic barrel 100 so as to enhancing the dimensional accuracy of the plastic barrel 100. Furthermore, in FIG. 1A, the inner annular image-end surface 125 can have an angle with the central axis of the plastic barrel 100, which is greater than 0 degrees and less than 90 degrees. In other words, the inner annular image-end surface 125 is neither parallel nor orthogonal to the central axis of the plastic barrel 100.

In FIG. 1A, the inner tube portion 130 can further include a plurality of parallel surfaces 137 parallel to the central axis of the plastic barrel 100, wherein a number of the parallel surfaces 137 is at least six. Therefore, it is favorable for allowing the plastic barrel 100 to carry more lens elements and avoiding the disorder among the lens elements during assembling.

In FIG. 1B and FIG. 1, the plastic barrel 100 can further include at least two gate traces 150 symmetrically disposed around the central axis of the plastic barrel 100. Therefore, it is favorable for reducing the defects from the injection molding process such as short shot or sink mark so as to enhance the manufacturing yield rate of the plastic barrel 100. In the 1st embodiment, a number of the gate traces 150 is four, wherein the gate traces 150 are symmetrically disposed around the central axis of the plastic barrel 100.

In FIG. 1A, the object-end portion 110 can further include an outer annular object-end surface 114, wherein the outer annular object-end surface 114 is connected to the outer object-end surface 112 and surrounds the object-end hole 111, and a distance between the outer annular object-end surface 114 and the central axis is greater than a distance between the inner annular object-end surface 115 and the central axis. In FIG. 10, the gate traces 150 are disposed on the outer annular object-end surface 114. Therefore, it is favorable for simplifying the mold design of the plastic barrel 100 so as to improve the production efficiency.

The data of the aforementioned parameters of the plastic barrel 100 according to the 1st embodiment of the present disclosure are listed in the following Table 1, wherein the parameters are also shown as FIG. 10.

TABLE 1

| 1st Embodiment | |
|---|---|
| w (mm) | 0.02 |
| h (mm) | 0.02 |

2nd Embodiment

Figure 2A:
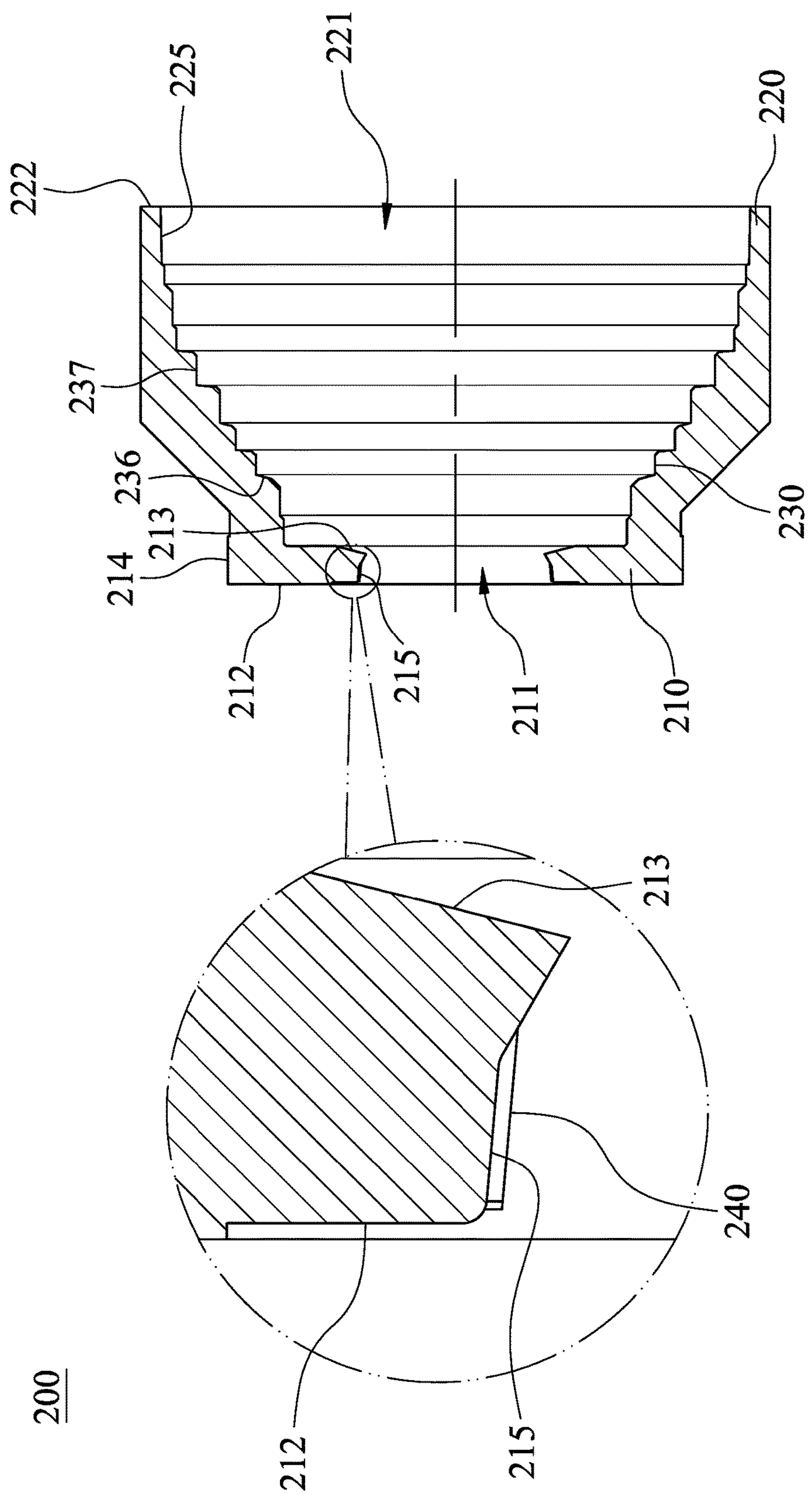
FIG. 2A is a schematic view of a plastic barrel according to the 2nd embodiment of the present disclosure.
Figure 2B:
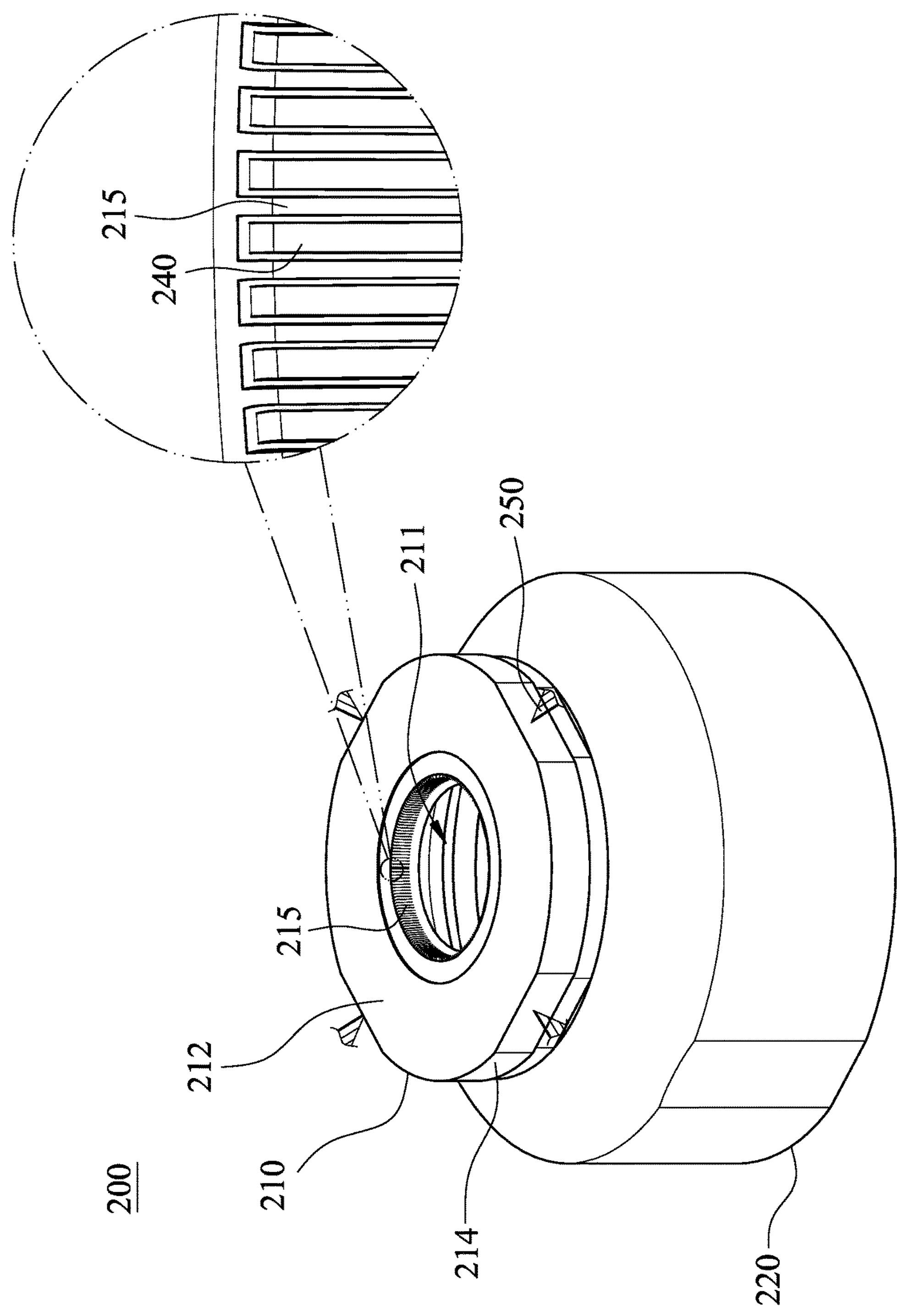
FIG. 2B shows a schematic view of the protrusions of the plastic barrel according to the 2nd embodiment.

FIG. 2A is a schematic view of a plastic barrel 200 according to the 2nd embodiment of the present disclosure, and FIG. 2B shows a schematic view of a plurality of protrusions 240 of the plastic barrel 200 according to the 2nd embodiment. In FIG. 2A and FIG. 2B, the plastic barrel 200 includes an object-end portion 210, an image-end portion 220, an inner tube portion 230 and the protrusions 240.

The object-end portion 210 includes an outer object-end surface 212, an object-end hole 211 and an inner annular object-end surface 215. The outer object-end surface 212 is the surface of the plastic barrel 200 facing an object (not shown). One side of the inner annular object-end surface 215 is connected to the outer object-end surface 212 and surrounds the object-end hole 211.

The image-end portion 220 includes an outer image-end surface 222, an image-end opening 221 and an inner annular image-end surface 225. The outer image-end surface 222 is the surface of the plastic barrel 200 facing an image surface (not shown). The inner annular image-end surface 225 is connected to the outer image-end surface 222 and surrounds the image-end opening 221.

The inner tube portion 230 connects the object-end portion 210 and the image-end portion 220, wherein the inner tube portion 230 surrounds a central axis of the plastic barrel 200 and faces the central axis. The inner tube portion 230 includes a plurality of inclined surfaces 236, wherein each of the inclined surfaces 236 has an angle with the central axis, which is greater than 0 degrees and less than 90 degrees. In other words, each of the inclined surfaces 236 is neither parallel nor orthogonal to the central axis of the plastic barrel 200.

Figure 2C:
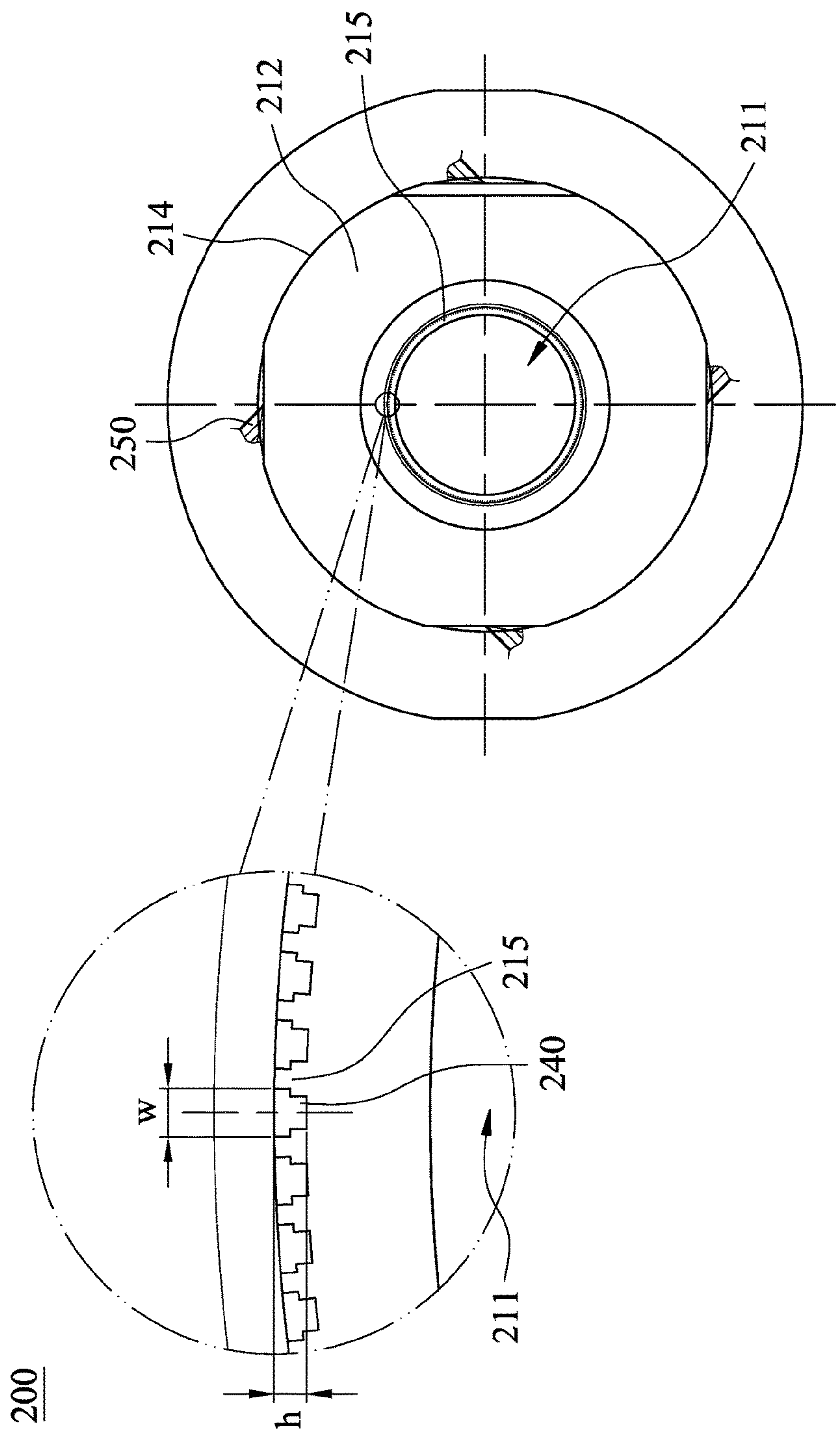
FIG. 2C shows a schematic view of the parameters w and h of the plastic barrel according to the 2nd embodiment.

In the 2nd embodiment, the inner annular object-end surface 215 has a circumferential direction around the central axis of the plastic barrel 200, wherein the protrusions 240 with the same geometric structures are disposed on the inner annular object-end surface 215, and regularly arranged with the same spaces in the circumferential direction around the central axis of the plastic barrel 200. FIG. 2C shows a schematic view of the parameters w and h of the plastic barrel 200 according to the 2nd embodiment. In FIG. 2B and FIG. 2C, each of the protrusions 240 includes at least one stepped surface. Therefore, it is favorable for effectively attenuating the non-imaging light reflected from the inner annular object-end surface 215 so as to further improve the image quality of the lens module.

In the 2nd embodiment, the protrusions 240 and the plastic barrel 200 are formed integrally. Furthermore, the object-end portion 210 further includes an inner object-end surface 213 connected to the other side of the inner annular object-end surface 215, wherein the inner object-end surface 213 is disposed correspondingly to the outer object-end surface 212. The protrusions 240 are disposed on the inner annular object-end surface 215 and near the outer object-end surface 212. A number of the protrusions 240 is greater than or equal to 80, and smaller than or equal to 800.

In FIG. 2A, an outer diameter of the object-end portion 210 is smaller than an outer diameter of the image-end portion 220. Furthermore, the inner annular image-end surface 225 has an angle with the central axis of the plastic barrel 200, which is greater than 0 degrees and less than 90 degrees. In other words, the inner annular image-end surface 225 is neither parallel nor orthogonal to the central axis of the plastic barrel 200. Moreover, the inner tube portion 230 further includes a plurality of parallel surfaces 237 parallel to the central axis of the plastic barrel 200, wherein a number of the parallel surfaces 237 is at least six.

In FIG. 2A, the object-end portion 210 further includes an outer annular object-end surface 214, wherein the outer annular object-end surface 214 is connected to the outer object-end surface 212 and surrounds the object-end hole 211, and a distance between the outer annular object-end surface 214 and the central axis is greater than a distance between the inner annular object-end surface 215 and the central axis. In FIG. 2B and FIG. 2C, the plastic barrel 200 further includes four gate traces 250 disposed on the outer annular object-end surface 214 and symmetrically around the central axis of the plastic barrel 200.

The data of the parameters w and h of the plastic barrel 200 according to the 2nd embodiment of the present disclosure are listed in the following Table 2, wherein the parameters are also shown as FIG. 2C. The definitions of these parameters shown in Table 2 are the same as those stated in the 1st embodiment with corresponding values for the 2nd embodiment.

TABLE 2

| 2nd Embodiment | |
|---|---|
| w (mm) | 0.03 |
| h (mm) | 0.02 |

3rd Embodiment

Figure 3A:
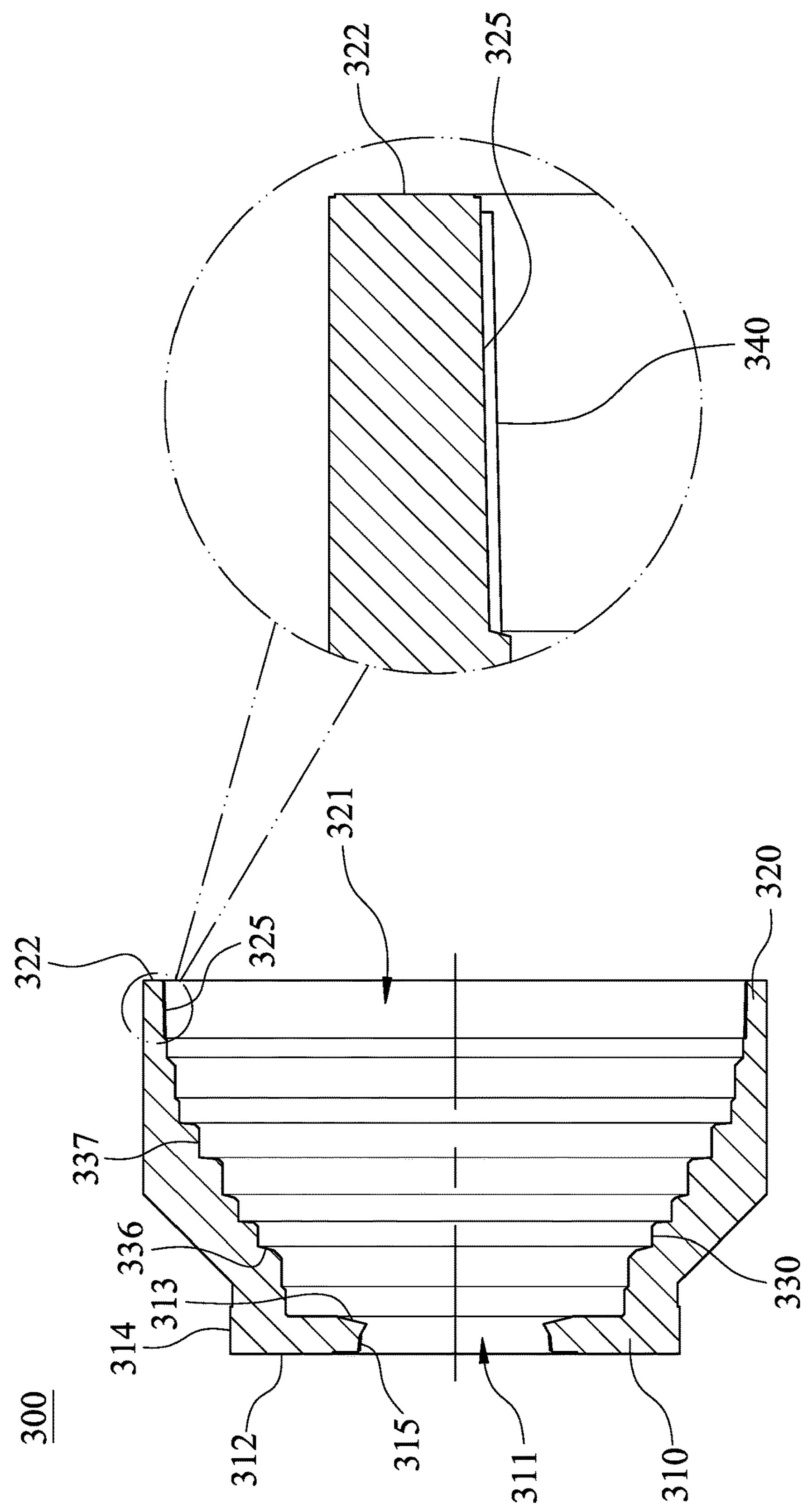
FIG. 3A is a schematic view of a plastic barrel according to the 3rd embodiment of the present disclosure.
Figure 3B:
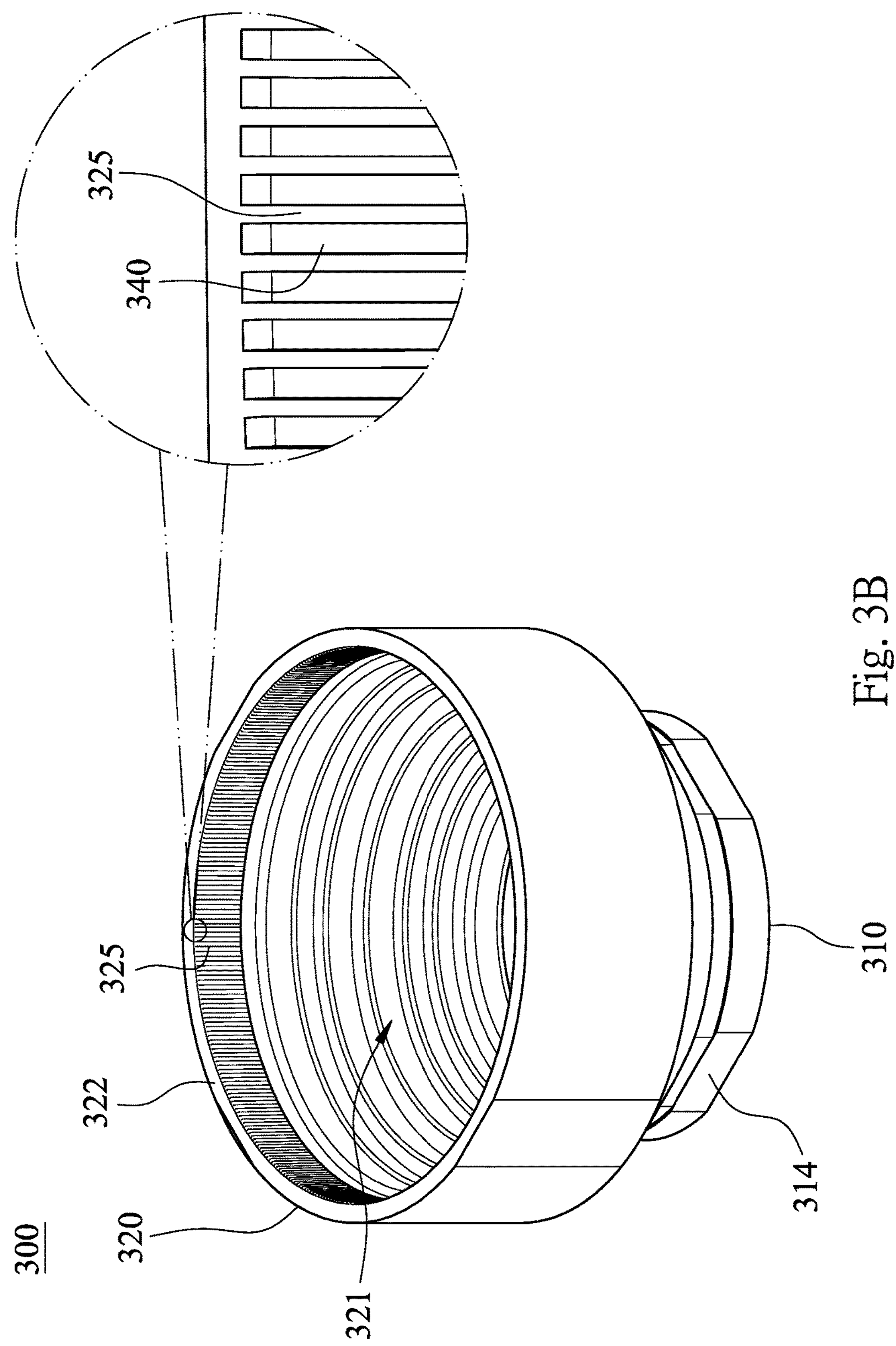
FIG. 3B shows a schematic view of the protrusions of the plastic barrel according to the 3rd embodiment.

FIG. 3A is a schematic view of a plastic barrel 300 according to the 3rd embodiment of the present disclosure, and FIG. 3B shows a schematic view of a plurality of protrusions 340 of the plastic barrel 300 according to the 3rd embodiment. In FIG. 3A and FIG. 3B, the plastic barrel 300 includes an object-end portion 310, an image-end portion 320, an inner tube portion 330 and the protrusions 340.

The object-end portion 310 includes an outer object-end surface 312, an object-end hole 311 and an inner annular object-end surface 315. The outer object-end surface 312 is the surface of the plastic barrel 300 facing an object (not shown). One side of the inner annular object-end surface 315 is connected to the outer object-end surface 312 and surrounds the object-end hole 311.

The image-end portion 320 includes an outer image-end surface 322, an image-end opening 321 and an inner annular image-end surface 325. The outer image-end surface 322 is the surface of the plastic barrel 300 facing an image surface (not shown). The inner annular image-end surface 325 is connected to the outer image-end surface 322 and surrounds the image-end opening 321.

The inner tube portion 330 connects the object-end portion 310 and the image-end portion 320, wherein the inner tube portion 330 surrounds a central axis of the plastic barrel 300 and faces the central axis. The inner tube portion 330 includes a plurality of inclined surfaces 336, wherein each of the inclined surfaces 336 has an angle with the central axis, which is greater than 0 degrees and less than 90 degrees. In other words, each of the inclined surfaces 336 is neither parallel nor orthogonal to the central axis of the plastic barrel 300.

In the 3rd embodiment, the protrusions 340 are disposed on the inner annular image-end surface 325 and the inner annular object-end surface 315. The protrusions 340 disposed on the inner annular image-end surface 325 are regularly arranged around the central axis of the plastic barrel 300. Therefore, it is favorable for effectively attenuating the non-imaging light reflected from the inner annular image-end surface 325 so as to improve the image quality of the lens module. Furthermore, the inner annular image-end surface 325 has a circumferential direction around the central axis of the plastic barrel 300, wherein the protrusions 340 with the same geometric structures are disposed on the inner annular image-end surface 325, and regularly arranged with the same spaces in the circumferential direction around the central axis of the plastic barrel 300.

In the 3rd embodiment, the inner annular image-end surface 325 has an angle with the central axis of the plastic barrel 300, which is greater than 0 degrees and less than 90 degrees. In other words, the inner annular image-end surface 325 is neither parallel nor orthogonal to the central axis of the plastic barrel 300. Therefore, it is favorable for easily molding the protrusions 340 on the inner annular image-end surface 325 so as to enhance the manufacturing yield rate.

The protrusions 340 disposed on the inner annular object-end surface 315 are regularly arranged around the central axis of the plastic barrel 300. In FIG. 3A, the object-end portion 310 further includes an inner object-end surface 313 connected to the other side of the inner annular object-end surface 315, wherein the inner object-end surface 313 is disposed correspondingly to the outer object-end surface 312. The protrusions 340 are disposed on the inner annular object-end surface 315 and near the outer object-end surface 312.

In the 3rd embodiment, the protrusions 340 and the plastic barrel 300 are formed integrally. Furthermore, a number of the protrusions 340 disposed on the inner annular image-end surface 325 is greater than or equal to 80, and smaller than or equal to 800.

In FIG. 3A, an outer diameter of the object-end portion 310 is smaller than an outer diameter of the image-end portion 320. Moreover, the inner tube portion 330 further includes a plurality of parallel surfaces 337 parallel to the central axis of the plastic barrel 300, wherein a number of the parallel surfaces 337 is at least six.

In the 3rd embodiment, the object-end portion 310 further includes an outer annular object-end surface 314, wherein the outer annular object-end surface 314 is connected to the outer object-end surface 312 and surrounds the object-end hole 311, and a distance between the outer annular object-end surface 314 and the central axis is greater than a distance between the inner annular object-end surface 315 and the central axis. Furthermore, the plastic barrel 300 further includes at least two gate traces (not shown) disposed on the outer annular object-end surface 314 and symmetrically around the central axis of the plastic barrel 300.

Figure 3C:
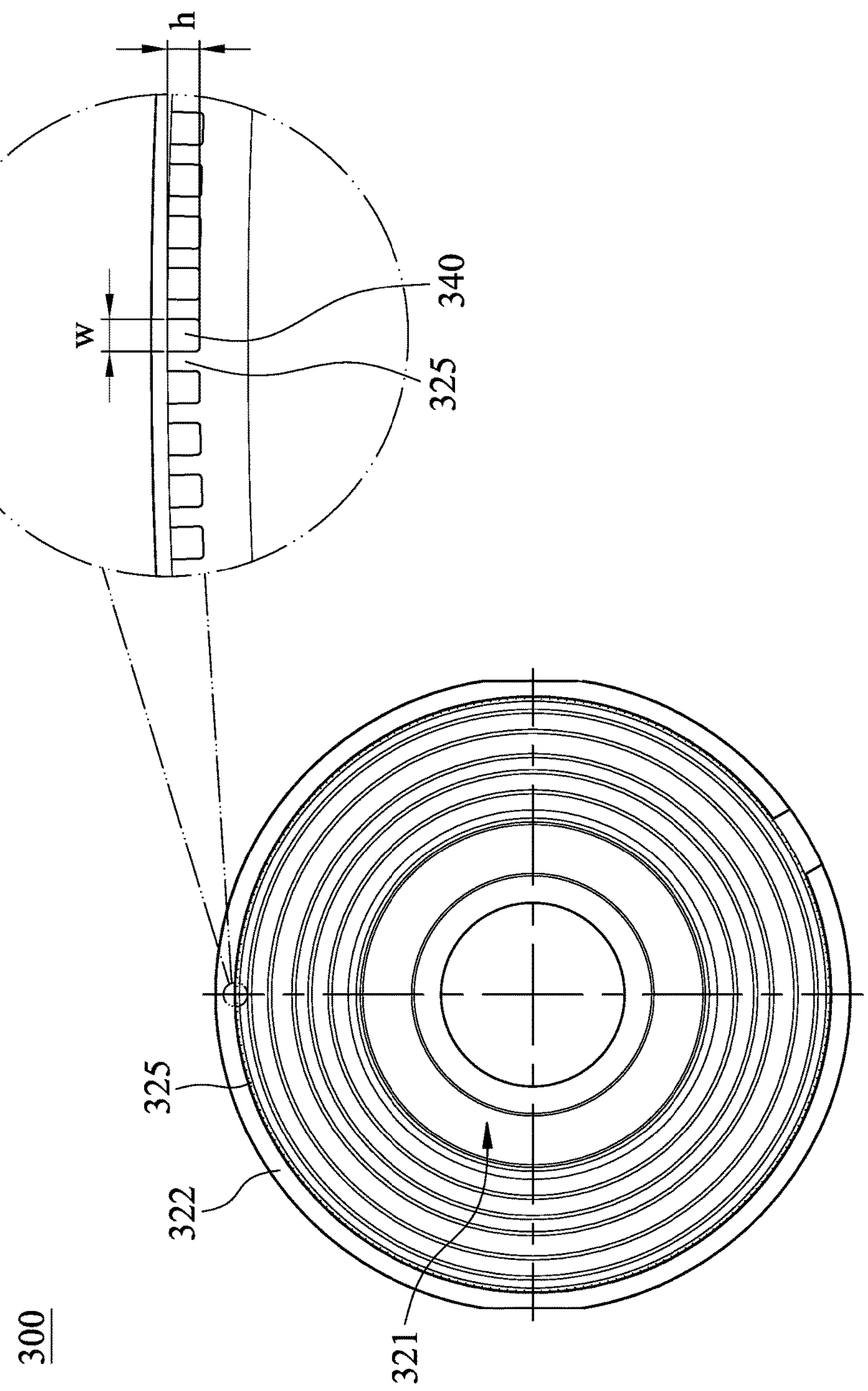
FIG. 3C shows a schematic view of the parameters w and h of the plastic barrel according to the 3rd embodiment.

FIG. 3C shows a schematic view of the parameters w and h of the plastic barrel 300 according to the 3rd embodiment. The data of the parameters w and h of the protrusions 340 disposed on the inner annular image-end surface 325 of the plastic barrel 300 according to the 3rd embodiment of the present disclosure are listed in the following Table 3, wherein the parameters are also shown as FIG. 3C. The definitions of these parameters shown in Table 3 are the same as those stated in the 1st embodiment with corresponding values for the 3rd embodiment.

TABLE 3

| 3rd Embodiment | |
|---|---|
| w (mm) | 0.02 |
| h (mm) | 0.02 |

4th Embodiment

Figure 4A:
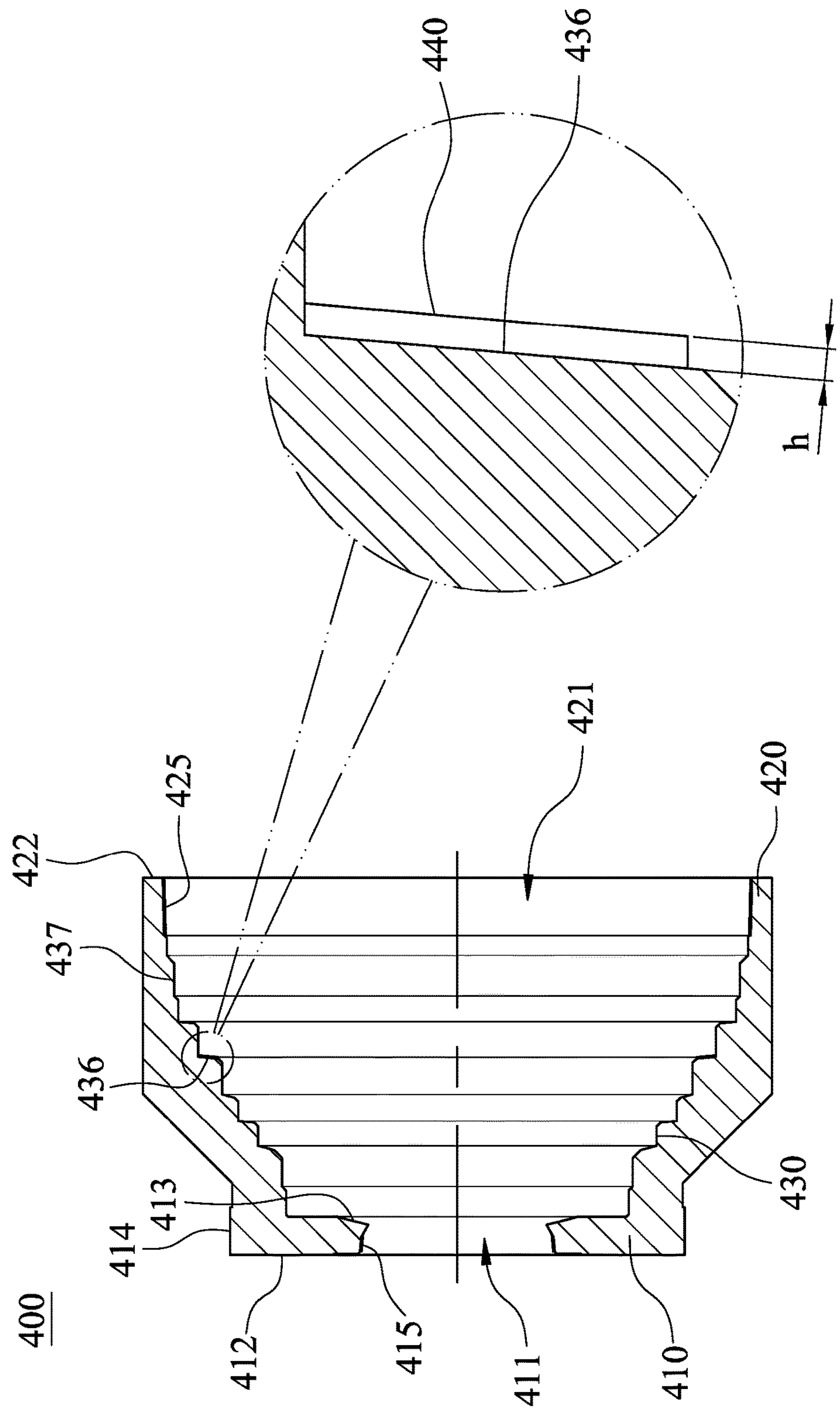
FIG. 4A is a schematic view of a plastic barrel according to the 4th embodiment of the present disclosure.
Figure 4B:
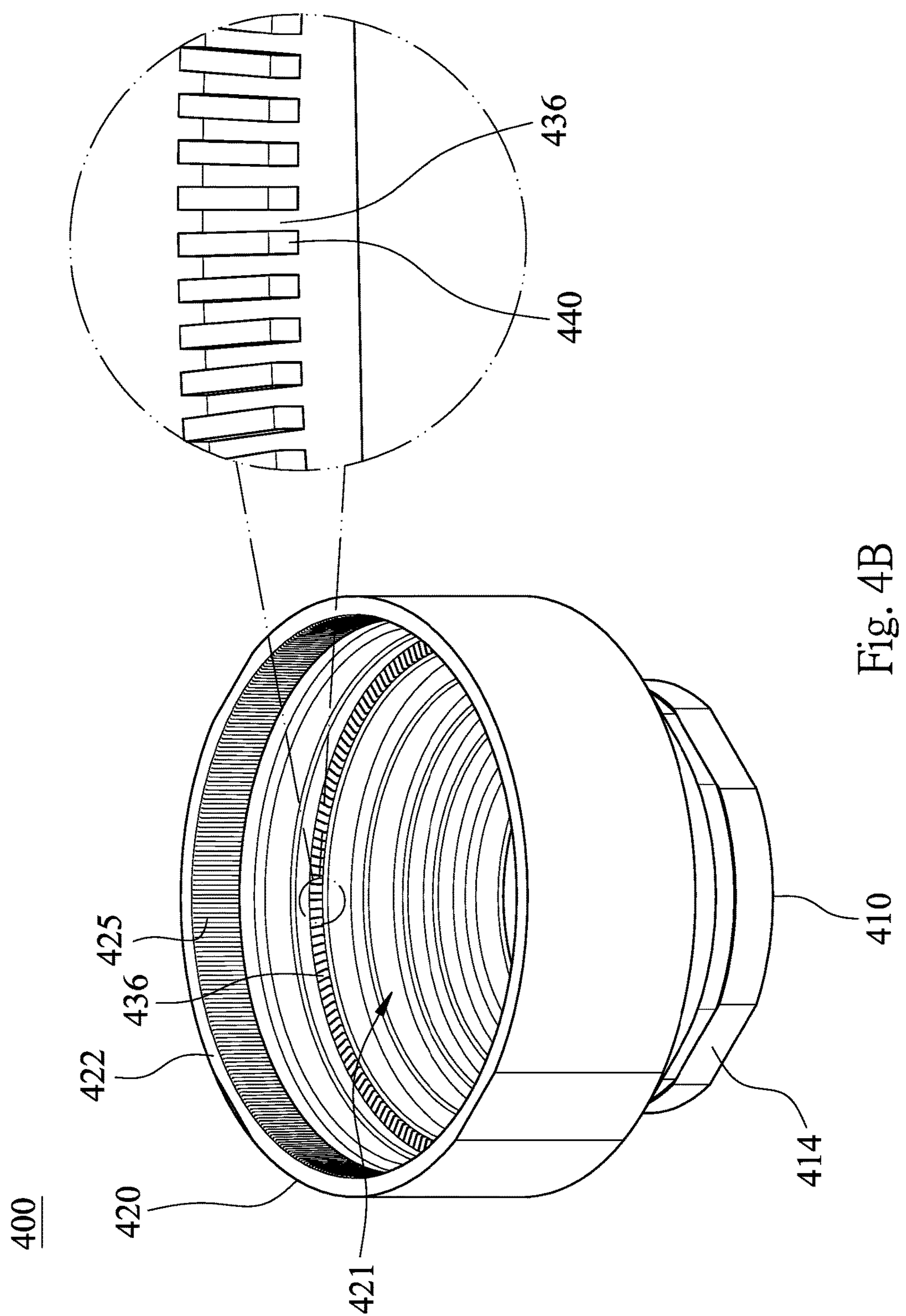
FIG. 4B shows a schematic view of the protrusions of the plastic barrel according to the 4th embodiment.

FIG. 4A is a schematic view of a plastic barrel 400 according to the 4th embodiment of the present disclosure, and FIG. 4B shows a schematic view of a plurality of protrusions 440 of the plastic barrel 400 according to the 4th embodiment. In FIG. 4A and FIG. 4B, the plastic barrel 400 includes an object-end portion 410, an image-end portion 420, an inner tube portion 430 and the protrusions 440.

The object-end portion 410 includes an outer object-end surface 412, an object-end hole 411 and an inner annular object-end surface 415. The outer object-end surface 412 is the surface of the plastic barrel 400 facing an object (not shown). One side of the inner annular object-end surface 415 is connected to the outer object-end surface 412 and surrounds the object-end hole 411.

The image-end portion 420 includes an outer image-end surface 422, an image-end opening 421 and an inner annular image-end surface 425. The outer image-end surface 422 is the surface of the plastic barrel 400 facing an image surface (not shown). The inner annular image-end surface 425 is connected to the outer image-end surface 422 and surrounds the image-end opening 421.

The inner tube portion 430 connects the object-end portion 410 and the image-end portion 420, wherein the inner tube portion 430 surrounds a central axis of the plastic barrel 400 and faces the central axis. The inner tube portion 430 includes a plurality of inclined surfaces 436, wherein each of the inclined surfaces 436 has an angle with the central axis, which is greater than 0 degrees and less than 90 degrees. In other words, each of the inclined surfaces 436 is neither parallel nor orthogonal to the central axis of the plastic barrel 400.

In the 4th embodiment, the protrusions 440 are disposed on one of the inclined surfaces 436, the inner annular object-end surface 415 and the inner annular image-end surface 425. The protrusions 440 disposed on the one of the inclined surfaces 436 are regularly arranged around the central axis of the plastic barrel 400. Therefore, it is favorable for effectively attenuating the non-imaging light reflected from the inclined surface 436 with the protrusions 440 so as to improve the image quality of the lens module. Furthermore, the inclined surface 436 with the protrusions 440 has a circumferential direction around the central axis of the plastic barrel 400, wherein the protrusions 440 with the same geometric structures are disposed on the inclined surface 436, and regularly arranged with the same spaces in the circumferential direction around the central axis of the plastic barrel 400.

The protrusions 440 disposed on the inner annular object-end surface 415 are regularly arranged around the central axis of the plastic barrel 400. In FIG. 4A, the object-end portion 410 further includes an inner object-end surface 413 connected to the other side of the inner annular object-end surface 415, wherein the inner object-end surface 413 is disposed correspondingly to the outer object-end surface 412. The protrusions 440 are disposed on the inner annular object-end surface 415 and near the outer object-end surface 412.

The protrusions 440 disposed on the inner annular image-end surface 425 are regularly arranged around the central axis of the plastic barrel 400. In FIG. 4A, the inner annular image-end surface 425 has an angle with the central axis of the plastic barrel 400, which is greater than 0 degrees and less than 90 degrees. In other words, the inner annular image-end surface 425 is neither parallel nor orthogonal to the central axis of the plastic barrel 400.

In the 4th embodiment, the protrusions 440 and the plastic barrel 400 are formed integrally. Furthermore, a number of the protrusions 440 disposed on the one of the inclined surfaces 436 is greater than or equal to 80, and smaller than or equal to 800.

In FIG. 4A, an outer diameter of the object-end portion 410 is smaller than an outer diameter of the image-end portion 420. Moreover, the inner tube portion 430 further includes a plurality of parallel surfaces 437 parallel to the central axis of the plastic barrel 400, wherein a number of the parallel surfaces 437 is at least six.

In the 4th embodiment, the object-end portion 410 further includes an outer annular object-end surface 414, wherein the outer annular object-end surface 414 is connected to the outer object-end surface 412 and surrounds the object-end hole 411, and a distance between the outer annular object-end surface 414 and the central axis is greater than a distance between the inner annular object-end surface 415 and the central axis. Furthermore, the plastic barrel 400 further includes at least two gate traces (not shown) disposed on the outer annular object-end surface 414 and symmetrically around the central axis of the plastic barrel 400.

Figure 4C:
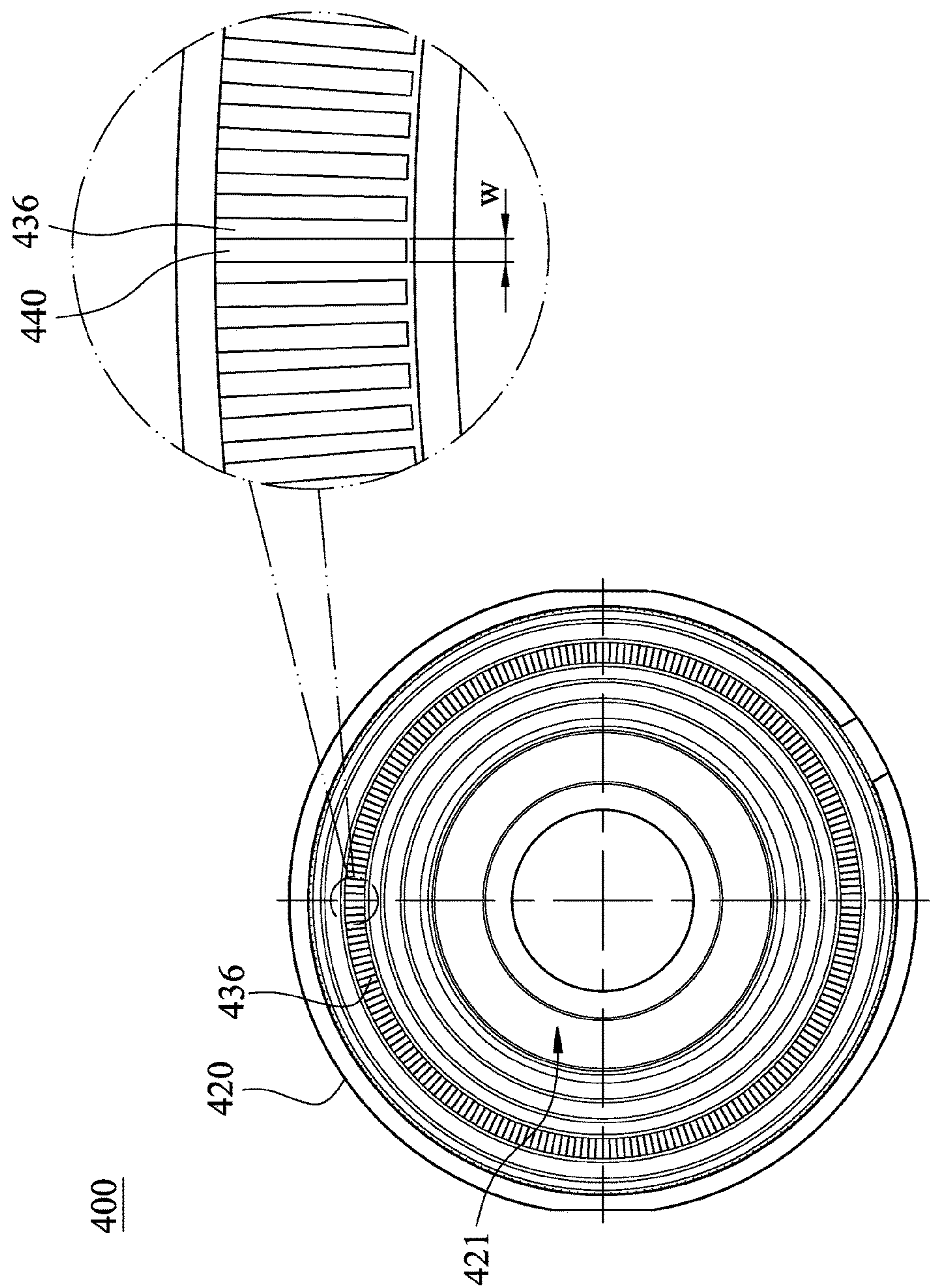
FIG. 4C shows a schematic view of the parameter w of the plastic barrel according to the 4th embodiment.

FIG. 4C shows a schematic view of the parameter w of the plastic barrel 400 according to the 4th embodiment. The data of the parameters w and h of the protrusions 440 disposed on the inclined surface 436 of the plastic barrel 400 according to the 4th embodiment of the present disclosure are listed in the following Table 4, wherein the parameters are also shown as FIG. 4A and FIG. 4C. The definitions of these parameters shown in Table 4 are the same as those stated in the 1st embodiment with corresponding values for the 4th embodiment.

TABLE 4

| 4th Embodiment | |
|---|---|
| w (mm) | 0.03 |
| h (mm) | 0.04 |

5th Embodiment

Figure 5A:
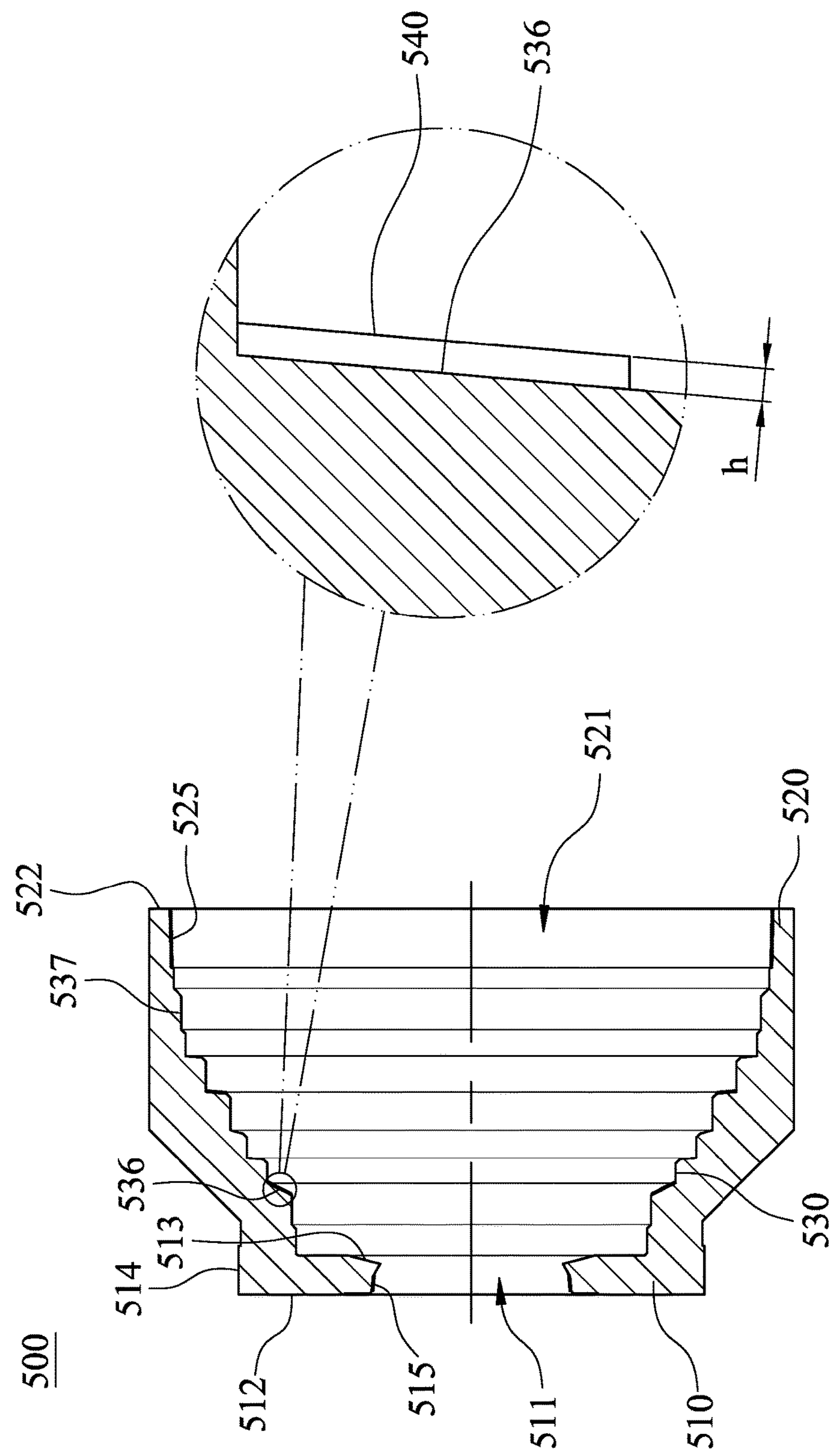
FIG. 5A is a schematic view of a plastic barrel according to the 5th embodiment of the present disclosure.

FIG. 5A is a schematic view of a plastic barrel 500 according to the 5th embodiment of the present disclosure. In FIG. 5A, the plastic barrel 500 includes an object-end portion 510, an image-end portion 520, an inner tube portion 530 and the protrusions 540.

The object-end portion 510 includes an outer object-end surface 512, an object-end hole 511 and an inner annular object-end surface 515. The outer object-end surface 512 is the surface of the plastic barrel 500 facing an object (not shown). One side of the inner annular object-end surface 515 is connected to the outer object-end surface 512 and surrounds the object-end hole 511.

The image-end portion 520 includes an outer image-end surface 522, an image-end opening 521 and an inner annular image-end surface 525. The outer image-end surface 522 is the surface of the plastic barrel 500 facing an image surface (not shown). The inner annular image-end surface 525 is connected to the outer image-end surface 522 and surrounds the image-end opening 521.

The inner tube portion 530 connects the object-end portion 510 and the image-end portion 520, wherein the inner tube portion 530 surrounds a central axis of the plastic barrel 500 and faces the central axis. The inner tube portion 530 includes a plurality of inclined surfaces 536, wherein each of the inclined surfaces 536 has an angle with the central axis, which is greater than 0 degrees and less than 90 degrees. In other words, each of the inclined surfaces 536 is neither parallel nor orthogonal to the central axis of the plastic barrel 500.

Figure 5B:
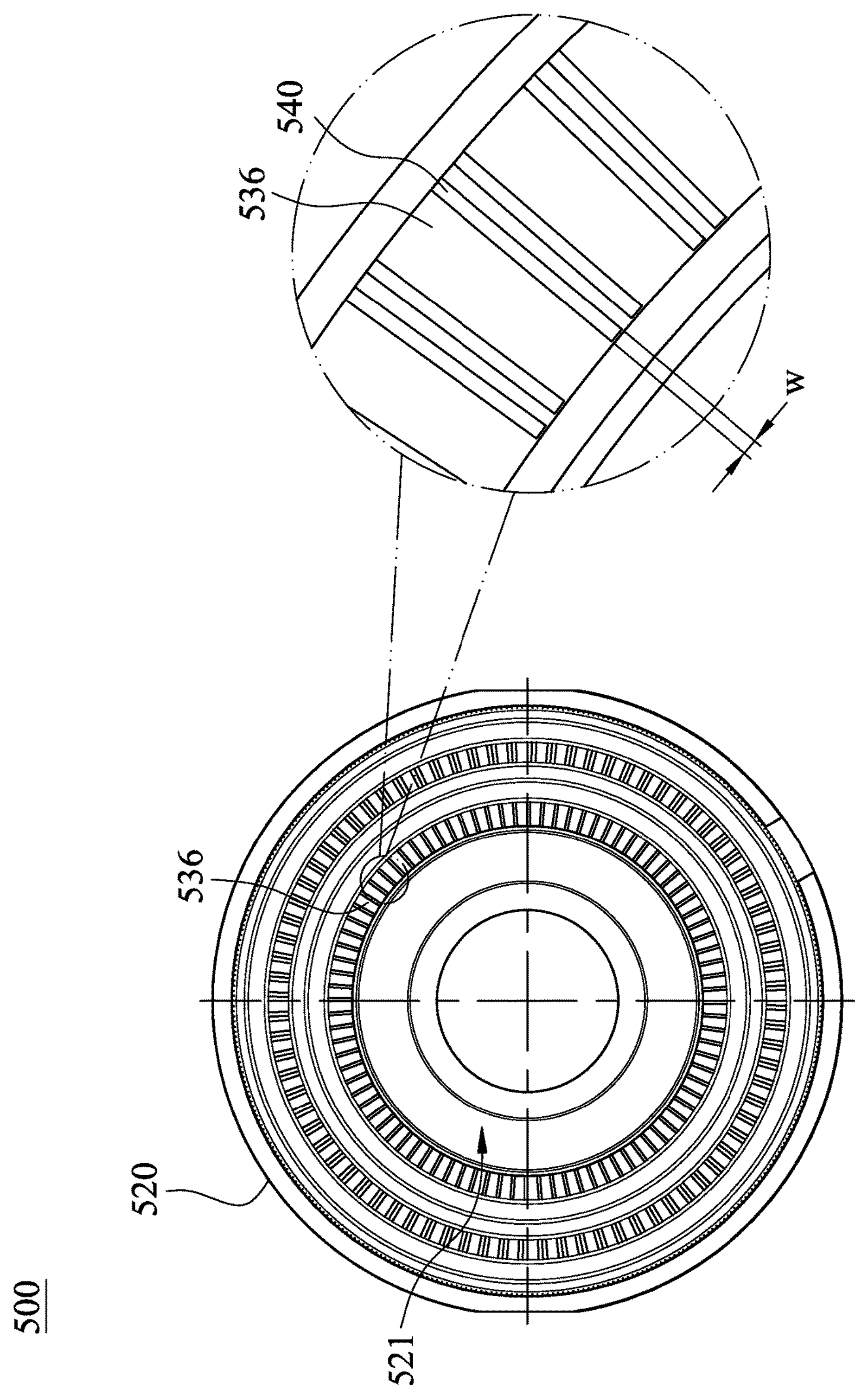
FIG. 5B shows a schematic view of the parameter w of the plastic barrel according to the 5th embodiment.

The protrusions 540 are disposed on two of the inclined surfaces 536, the inner annular object-end surface 515 and the inner annular image-end surface 525. FIG. 5B shows a schematic view of the parameter w of the plastic barrel 500 according to the 5th embodiment. In FIG. 5A and FIG. 5B, the protrusions 540 disposed on one of the inclined surfaces 536 are regularly arranged around the central axis of the plastic barrel 500. In details, the one of the inclined surfaces 536 has a circumferential direction around the central axis of the plastic barrel 500, wherein the protrusions 540 with the same geometric structures are disposed on the one of the inclined surfaces 536. Two of the protrusions 540 are formed one set and regularly arranged in the circumferential direction around the central axis of the plastic barrel 500, wherein the spaces between two sets adjacent to each other are the same. Furthermore, the protrusions 540 disposed on another of the inclined surfaces 536 are regularly arranged around the central axis of the plastic barrel 500.

The protrusions 540 disposed on the inner annular object-end surface 515 are regularly arranged around the central axis of the plastic barrel 500. In FIG. 5A, the object-end portion 510 further includes an inner object-end surface 513 connected to the other side of the inner annular object-end surface 515, wherein the inner object-end surface 513 is disposed correspondingly to the outer object-end surface 512. The protrusions 540 are disposed on the inner annular object-end surface 515 and near the outer object-end surface 512.

The protrusions 540 disposed on the inner annular image-end surface 525 are regularly arranged around the central axis of the plastic barrel 500. In FIG. 5A, the inner annular image-end surface 525 has an angle with the central axis of the plastic barrel 500, which is greater than 0 degrees and less than 90 degrees. In other words, the inner annular image-end surface 525 is neither parallel nor orthogonal to the central axis of the plastic barrel 500.

In the 5th embodiment, the protrusions 540 and the plastic barrel 500 are formed integrally. Furthermore, a number of the protrusions 540 on the one of the inclined surfaces 536 is greater than or equal to 80, and smaller than or equal to 800.

In FIG. 5A, an outer diameter of the object-end portion 510 is smaller than an outer diameter of the image-end portion 520. Moreover, the inner tube portion 530 further includes a plurality of parallel surfaces 537 parallel to the central axis of the plastic barrel 500, wherein a number of the parallel surfaces 537 is at least six.

In the 5th embodiment, the object-end portion 510 further includes an outer annular object-end surface 514, wherein the outer annular object-end surface 514 is connected to the outer object-end surface 512 and surrounds the object-end hole 511, and a distance between the outer annular object-end surface 514 and the central axis is greater than a distance between the inner annular object-end surface 515 and the central axis. Furthermore, the plastic barrel 500 further includes at least two gate traces (not shown) disposed on the outer annular object-end surface 514 and symmetrically around the central axis of the plastic barrel 500.

The data of the parameters w and h of the protrusions 540 disposed on the one of the inclined surface 536 of the plastic barrel 500 according to the 5th embodiment of the present disclosure are listed in the following Table 5, wherein the parameters are also shown as FIG. 5A and FIG. 5B. The definitions of these parameters shown in Table 5 are the same as those stated in the 1st embodiment with corresponding values for the 5th embodiment.

TABLE 5

| 5th Embodiment | |
|---|---|
| w (mm) | 0.02 |
| h (mm) | 0.04 |

6th Embodiment

Figure 6:
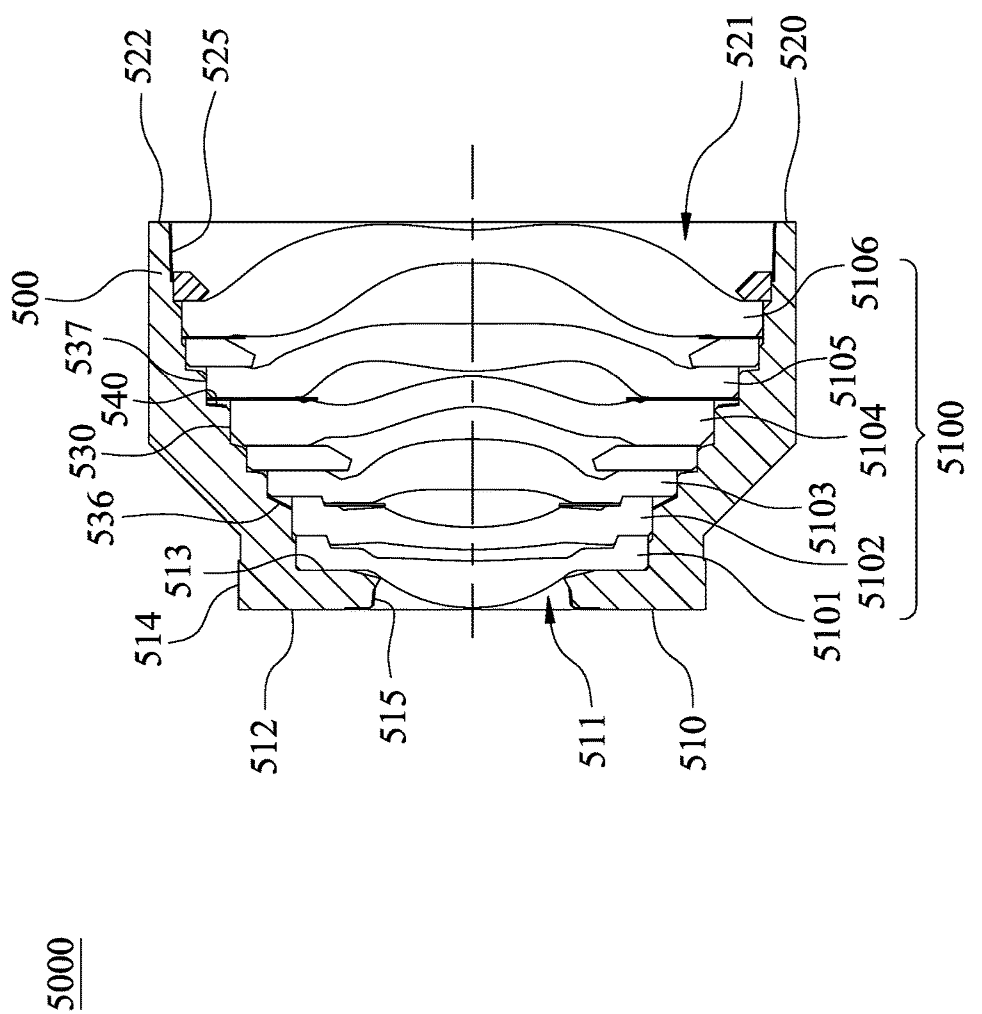
FIG. 6 shows a lens module according to the 6th embodiment of the present disclosure.

FIG. 6 shows a lens module 5000 according to the 6th embodiment of the present disclosure. In FIG. 6, the lens module 5000 includes the plastic barrel 500 according to the 5th embodiment of the present disclosure and an optical lens assembly 5100.

The optical lens assembly 5100 is disposed in the plastic barrel 500 and includes a plurality of lens elements (5101-5106).

In FIG. 5A and FIG. 6, the plastic barrel 500 includes the object-end portion 510, the image-end portion 520, the inner tube portion 530 and the protrusions 540. The object-end portion 510 includes the outer object-end surface 512, the object-end hole 511 and the inner annular object-end surface 515. The image-end portion 520 includes the outer image-end surface 522, the image-end opening 521 and the inner annular image-end surface 525. The inner tube portion 530 includes the inclined surfaces 536.

In the 6th embodiment, the protrusions 540 are disposed on the inner annular object-end surface 515, the inner annular image-end surface 525 and two of the inclined surfaces 536, wherein the protrusions 540 are regularly arranged around the central axis of the plastic barrel 500. Therefore, it is favorable for effectively attenuating the non-imaging light reflected from the aforementioned surfaces so as to improve the image quality of the lens module 5000.

Furthermore, the inner tube portion 530 further includes the parallel surfaces 537 parallel to the central axis of the plastic barrel 500, wherein the number of the parallel surfaces 537 is at least six. Therefore, it is favorable for allowing the plastic barrel 500 to carry more lens elements and avoiding the disorder among the lens elements during assembling. The other details of the plastic barrel 500 have been described in the foregoing paragraphs and will not be described again herein.

Moreover, the object-end hole 511 can be an aperture stop of the optical lens assembly 5100. Therefore, it is favorable for reducing the complexity of mechanism design of the lens module 5000.

In details, the optical lens assembly 5100 includes, in order from the object-end portion 510 of the plastic barrel 500 to the image-end portion 520 thereof, the first lens element 5101, the second lens element 5102, the third lens element 5103, the fourth lens element 5104, the fifth lens element 5105 and the sixth lens element 5106, wherein the lens elements 5101-5106 are respectively abutted with a plurality of optical elements (its reference numeral is omitted) so as to be disposed in the plastic barrel 500.

7th Embodiment

Figure 7:
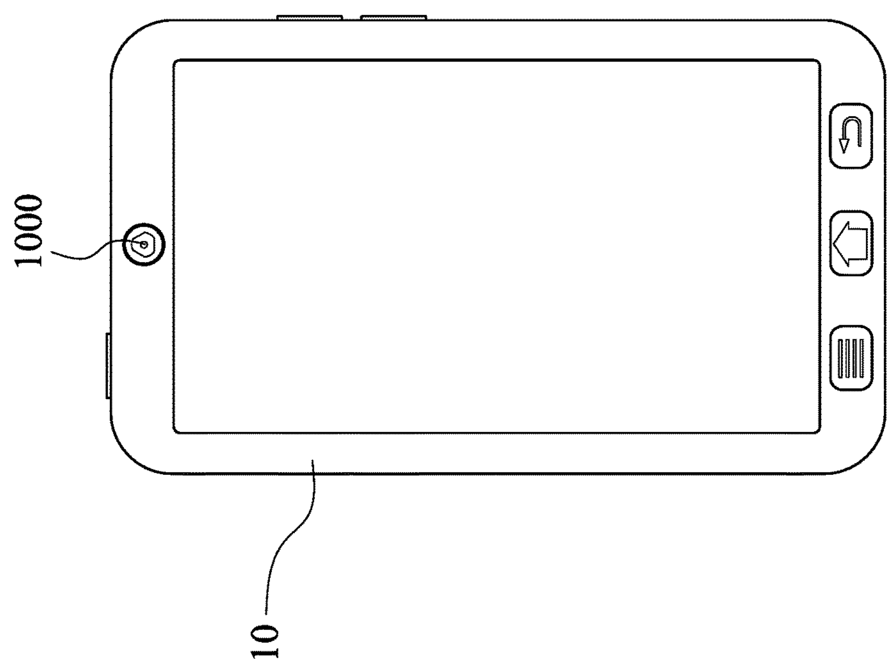
FIG. 7 shows an electronic device according to the 7th embodiment of the present disclosure.

FIG. 7 shows an electronic device 10 according to the 7th embodiment of the present disclosure. The electronic device 10 of the 7th embodiment is a smart phone, wherein the electronic device 10 includes a lens module 1000, and the lens module 1000 includes a plastic barrel (not shown) according to the present disclosure. Therefore, it is favorable for effectively attenuating the non-imaging light so as to improve the image quality and satisfy the requirements of high-end electronic devices with camera functionalities. Furthermore, the electronic device 10 can further include an image sensor disposed on or near an image surface of the lens module 1000. Preferably, the electronic device 10 can further include but not limited to a display, a control unit, a storage unit, a random access memory unit (RAM), a read-only memory unit (ROM) or a combination thereof.

8th Embodiment

Figure 8:
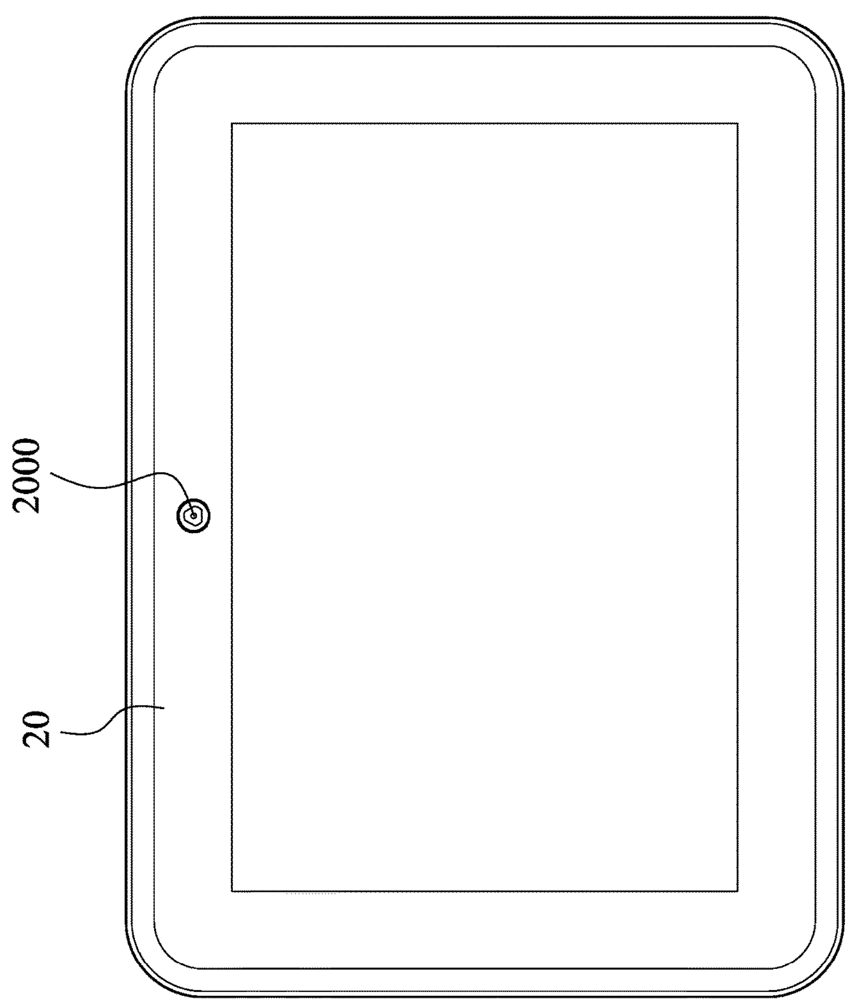
FIG. 8 shows an electronic device according to the 8th embodiment of the present disclosure.

FIG. 8 shows an electronic device 20 according to the 8th embodiment of the present disclosure. The electronic device 20 of the 8th embodiment is a tablet personal computer, wherein the electronic device 20 includes a lens module 2000, and the lens module 2000 includes a plastic barrel (not shown) according to the present disclosure.

9th Embodiment

Figure 9:
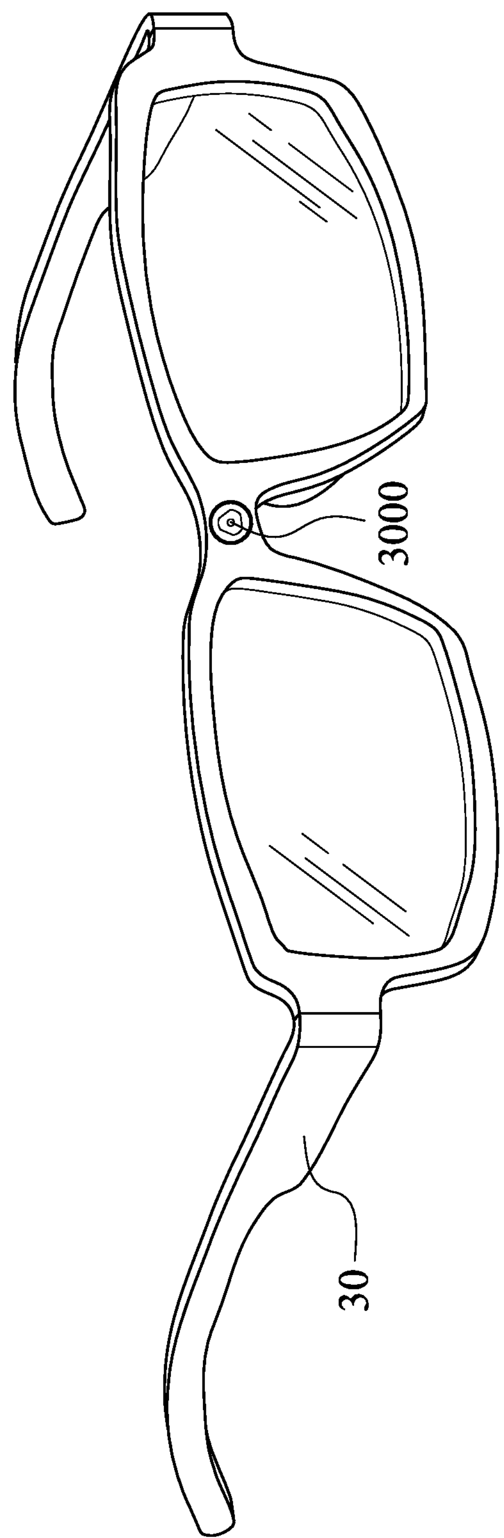
FIG. 9 shows an electronic device according to the 9th embodiment of the present disclosure.

FIG. 9 shows an electronic device 30 according to the 9th embodiment of the present disclosure. The electronic device 30 of the 9th embodiment is a wearable device, wherein the electronic device 30 includes a lens module 3000, and the lens module 3000 includes a plastic barrel (not shown) according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A plastic barrel, which is for holding at least one lens element, comprising:

an object-end portion, comprising:

an outer object-end surface;

an object-end hole; and an inner annular object-end surface, wherein one side of the inner annular object-end surface is connected to the outer object-end surface and surrounds the object-end hole;

an image-end portion, comprising:

an outer image-end surface;

an image-end opening; and an inner annular image-end surface, wherein the inner annular image-end surface is connected to the outer image-end surface and surrounds the image-end opening;

an inner tube portion connecting the object-end portion and the image-end portion, and comprising:

a plurality of inclined surfaces, wherein each of the inclined surfaces has an angle with a central axis of the plastic barrel; and a plurality of protrusions disposed on the inner annular object-end surface and near the outer object-end surface, wherein the protrusions are regularly arranged around the central axis of the plastic barrel, the protrusions are strip-shaped and extend along an optical axis of the at least one lens element, and the protrusions do not have contact with the at least one lens element.

2. The plastic barrel of claim 1, wherein the protrusions and the plastic barrel are formed integrally.

3. The plastic barrel of claim 2, wherein the object-end portion further comprises:

an inner object-end surface connected to the other side of the inner annular object-end surface.

4. The plastic barrel of claim 1, wherein a number of the protrusions is greater than or equal to 80, and smaller than or equal to 800.

5. The plastic barrel of claim 1, wherein a width of each of the protrusions in a circumferential direction of the plastic barrel is w, and the following condition is satisfied:

$$0.01\text{ mm}<w<0.05\text{ mm}.$$

6. The plastic barrel of claim 1, wherein a height of each of the protrusions is h, and the following condition is satisfied:

$$0.01\text{ mm}<h<0.06\text{ mm}.$$

7. The plastic barrel of claim 1, wherein the inner tube portion further comprises:

a plurality of parallel surfaces parallel to the central axis of the plastic barrel, wherein a number of the parallel surfaces is at least six.

8. The plastic barrel of claim 1, wherein the inner annular image-end surface has an angle with the central axis of the plastic barrel.

9. The plastic barrel of claim 1, wherein an outer diameter of the object-end portion is smaller than an outer diameter of the image-end portion.

10. The plastic barrel of claim 1, further comprising:

at least two gate traces symmetrically disposed around the central axis of the plastic barrel.

11. The plastic barrel of claim 10, wherein the object-end portion further comprises:

an outer annular object-end surface, wherein the outer annular object-end surface is connected to the outer object-end surface and surrounds the object-end hole, a distance between the outer annular object-end surface and the central axis is greater than a distance between the inner annular object-end surface and the central axis, and the gate traces disposed on the outer annular object-end surface.

12. A lens module, comprising:

the plastic barrel of claim 1; and an optical lens assembly disposed in the plastic barrel and comprising a plurality of lens elements.

13. The lens module of claim 12, wherein the object-end hole is an aperture stop of the optical lens assembly.

14. An electronic device, comprising:

the lens module of claim 12.

* * * * *